United States Patent [19]

Cardon et al.

[11] E Re. 28,997

[45] Reissued Oct. 5, 1976

[54] DIGITAL DETECTOR OF AN ANALOG SIGNAL

[75] Inventors: Carlos D. Cardon; Lawrence P. Griffone, both of Salt Lake City, Utah

[73] Assignee: Sperry Rand Corporation, New York, N.Y.

[22] Filed: Oct. 20, 1975

[21] Appl. No.: 623,863

Related U.S. Patent Documents

Reissue of:

[64] Patent No.: 3,845,399
Issued: Oct. 29, 1974
Appl. No.: 393,117
Filed: Aug. 30, 1973

[52] U.S. Cl. ..... 328/138; 307/233 R; 307/295; 328/140; 328/167

[51] Int. Cl.² ..... H03D 3/00; H03B 3/04; H03K 5/20

[58] Field of Search ..... 307/233, 295; 328/138, 328/140, 167; 324/78 D

[56] References Cited

UNITED STATES PATENTS

| | | | |
|---|---|---|---|
| 3,537,001 | 10/1970 | Friend | 328/138 |
| 3,543,172 | 11/1970 | Seppeler | 307/233 |
| 3,619,651 | 11/1971 | Aldrich | 307/233 |
| 3,757,233 | 9/1973 | Dixon | 328/138 |
| 3,761,809 | 9/1973 | Lockitt et al. | 328/140 |
| 3,769,583 | 10/1973 | Spencer et al. | 328/140 |
| 3,769,596 | 10/1973 | Peersch | 328/138 |

*Primary Examiner*—Stanley D. Miller, Jr.
*Attorney, Agent, or Firm*—Kenneth T. Grace; Thomas J. Nikolai; Marshall M. Truex

[57] ABSTRACT

A circuit combination of integrated circuit (IC) digital devices for detecting an analog signal of a selected frequency and amplitude is disclosed. The circuit combination is a special-purpose digital filter of a predetermined bandwidth determined by the sample time $T_S$ duration and the low $F_L$ and high $F_H$ frequencies of the passable analog signal frequency having a carrier frequency $F_A$. The analog signal is initially tested for minimal amplitude and converted to a digital signal by a conventional comparator circuit. The pulses of the digital signal are counted over the sample time $T_S$ and compared to the passable bandwidth: if the analog signal frequency $F_A$ [$(F_L \leq F_A \leq F_H)$] is within the bandpass, $F_L \leq F_A < F_H$, i.e., passable, a first binary signal is produced; alternatively, if the analog signal frequency $F_A$ [$(F_L > F_A \geq F_H)$] is without the bandpass, $F_L > F_A \geq F_H$, i.e., not passable, a second binary signal is produced. Sample times continue throughout the detection-comparing operation to ensure a continuous filtering process.

10 Claims, 4 Drawing Figures

DIGITAL DETECTOR OF AN ANALOG SIGNAL

Matter enclosed in heavy brackets [ ] appears in the original patent but forms no part of this reissue specification; matter printed in italics indicates the additions made by reissue.

BACKGROUND OF THE INVENTION

Prior art detectors of an analog signal of a selected frequency and amplitude have been designed using an analog filter that passes only an analog signal of the selected frequency and amplitude followed by a full-wave or half-wave rectifier and then a Schmitt trigger. Because of the availability of inexpensive and reliable digital circuits it is desirable that previous analog techniques be replaced by digital techniques as proposed by the present invention.

SUMMARY OF THE INVENTION

In the digital filter of the present invention, an analog input signal of a frequency $F_A$ is initially tested for minimum amplitude and then converted to a binary digital waveform which is edge detected to provide an output pulse for every cycle of the analog input signal. The first output pulse sets a sample time generator and the pulses are counted over the sample time $T_S$. If the pulse count is within the bandpass at any time during the sample time $T_S$ the counter and a binary decoder set a flip-flop to a True state. This flip-flop is sampled at the end of the sample time and the True output is transferred to a storage element which is switched to the True condition. The True condition of the storage element after a one pulse width delay time then resets the counter back to O. A time generator synchronizer driven by the output of the edge detector is disabled if the condition of the storage element is True. During the next successive sample time $T_S$ the procedurre is repeated with the counter counting the number of pulses from the edge detector. If the number of pulses counted is within the bandpass the binary decoder continues coupling a True condition to the storage element with the counter reset as before and the time generator synchronizer being disabled. If during the next sample time $T_S$ the counter counts a number of pulses without the bandpass the binary decoder couples a False output signal indicating that the analog input signal is of a frequency outside the bandpass. This False condition signal is delayed one pulse width to activate the time generator synchronizer in preparation for the next incoming pulse from the edge detector which incoming pulse initiates the sample time generator after which the detector-comparing operation is repeated.

DESCRIPTION OF THE PREFERRED EMBODIMENT

Figure 1:
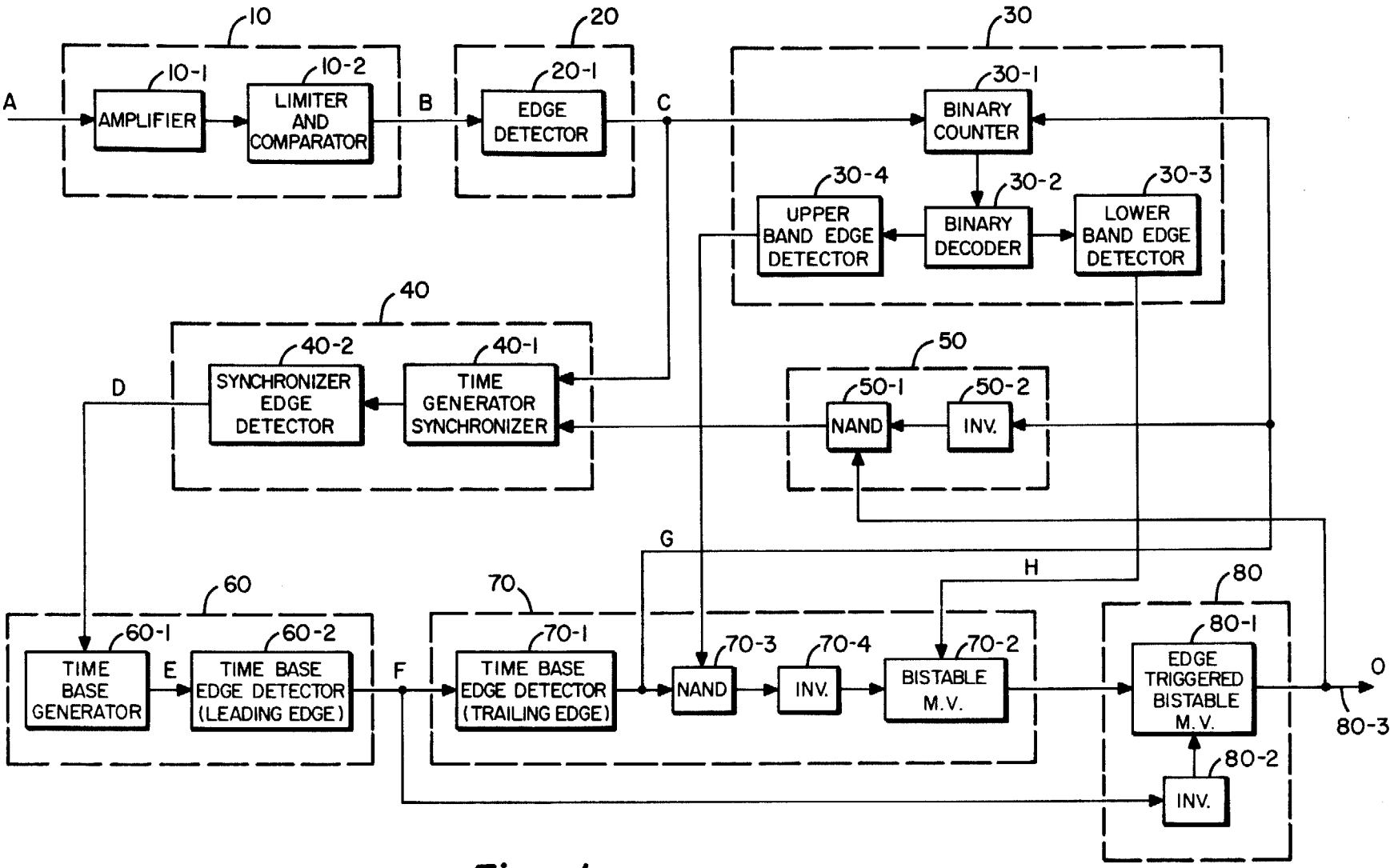
FIG. 1 is a block diagram of the special-purpose digital filter of the present invention.
Figure 2A:
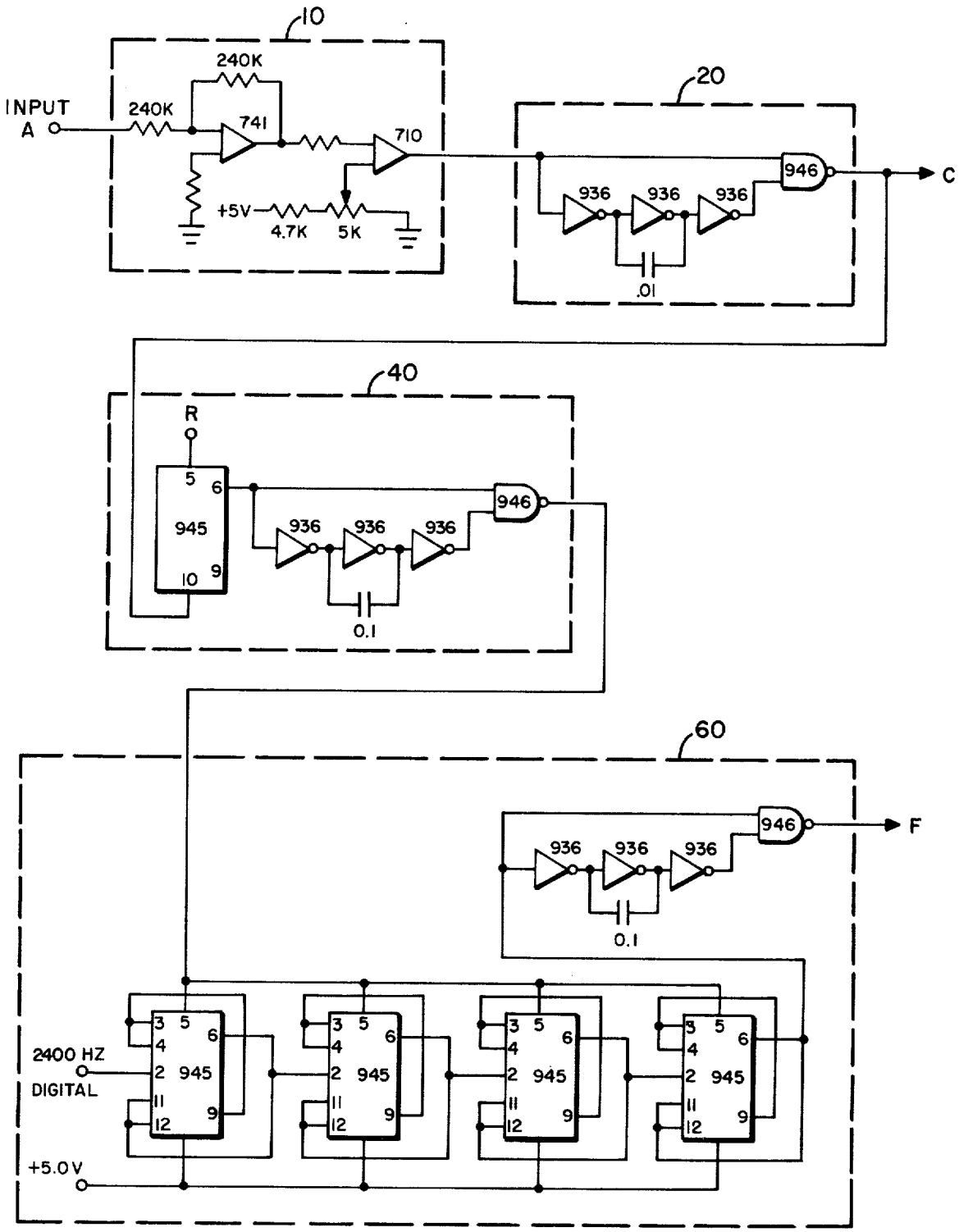
FIG. 2, consisting of FIGS. 2a, 2b, is a logic level drawing of the special-purpose digital filter of FIG. 1.
Figure 2B:
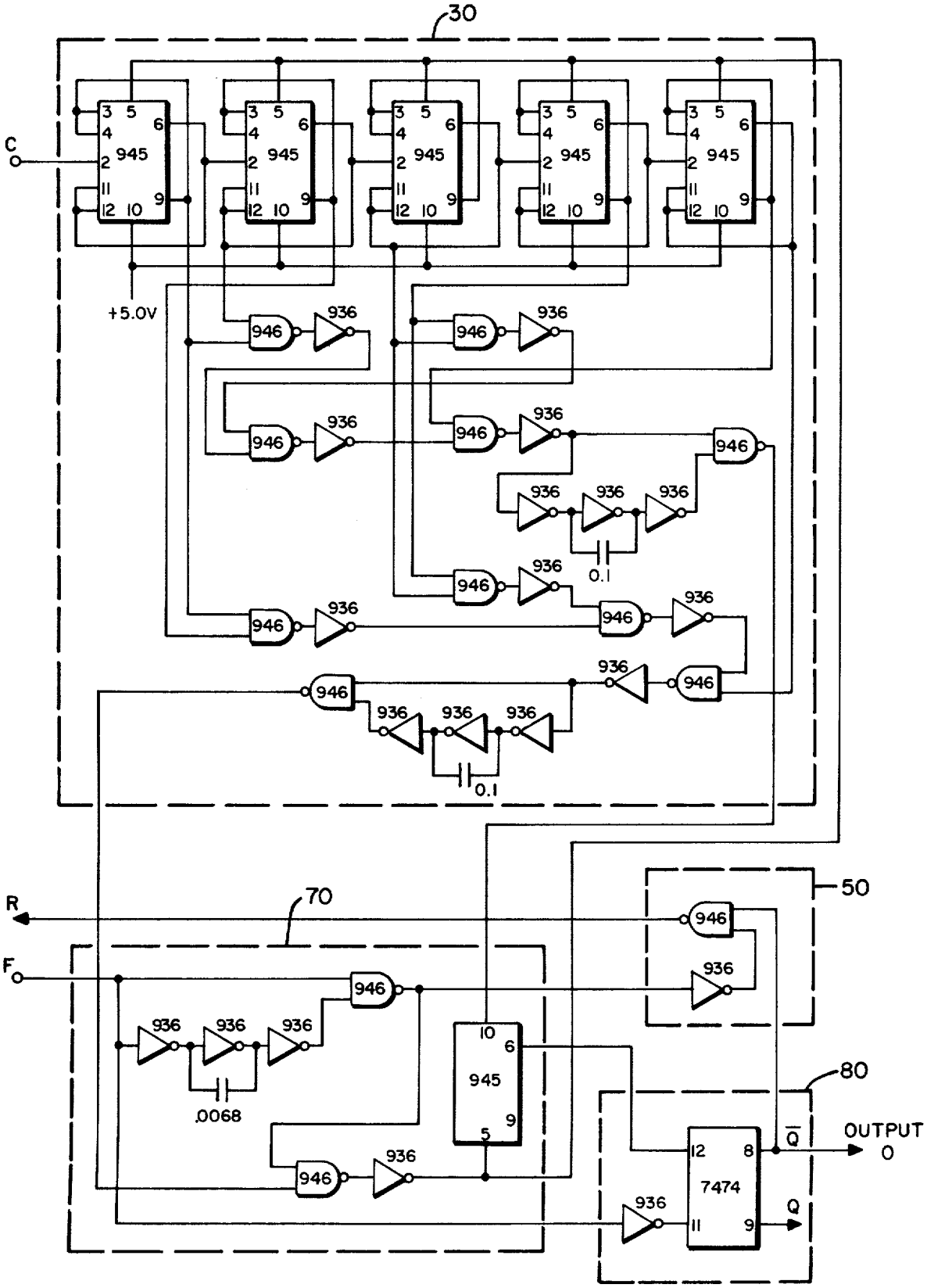

With particular reference to FIG. 1 there is presented a block diagram of the special-purpose digital filter of the present invention, the elements thereof being illustrated in detail at their logic level in FIGS. 2a and 2b. The special-purpose digital filter of the present invention basically establishes a fixed sample time $T_S$ during which the actual number $N_A$ of cycles or pulses of a sampled signal are counted. The number $N_A$ is then compared to the minimum number $N_L$ and the maximum number $N_H$ of cycles or pulses that define the bandpass width of the filter. If within that range, i.e., [$N_L \leq N_A \leq N_H$] $N_L \leq N_A < N_H$ a first True signal is generated and if without the range, i.e., [$N_L > N_A > N_H$] $N_L > N_A \geq N_H$, a second False signal is generated. The True and/or False signals are then set into a flip-flop and the flip-flop output is in turn clocked into the output storage element (flip-flop) at the end of the sample period. Thus the True condition of the output storage element indicates that a signal meeting the amplitude and frequency condition is present at the input to the circuit. Conversely, the False condition indicates that the signal does not meet these conditions. Using the timing diagram of FIG. 3 to explain the operation of the present invention illustrated in FIGS. 1, 2a, 2b certain parameters shall be assumed by way of example to better illustrate the operation of the present invention in its preferred embodiments of FIGS. 2a, 2b:

$$F_L = 900 \text{ Hz}$$

$$F_H = 3000 \text{ Hz}$$

$$T_S = 1/1.5 \times [10^{-2}]\ 10^{+2} \text{ Hz} = 6.67 \times 10^{-3} \text{ sec.}$$

Thus the sampled signal shall be sampled over a duration of $6.67 \times 10^{-3}$ sec. and if the sampled signal frequency $F_A$ is within the bandpass width, i.e., [$N_L \leq N_A \leq N_H$] $N_L \leq N_A < N_H$, the filter shall [generated] *generate* a True signal output and, alternatively, if the sample signal frequency is without the bandpass width the filter shall generate a False signal output.

Figure 3:
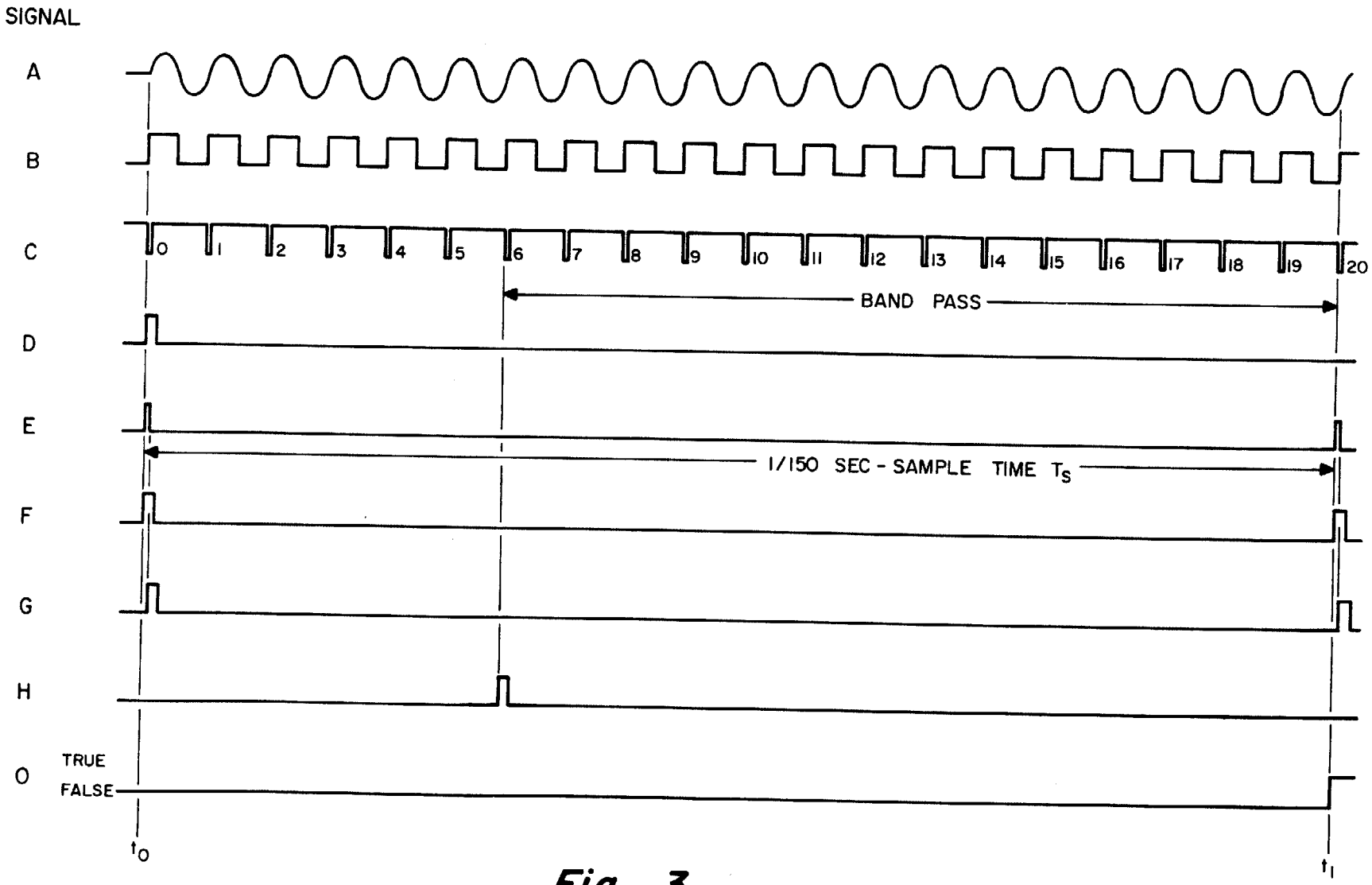
FIG. 3 is a timing diagram illustrating the operation of the special-purpose digital filter of FIG. 1.

Referring to the signal waveforms of FIG. 3, the analog signal A of a frequency $F_A$ is coupled to comparator 10. Signal A is initially coupled to amplifier 10-1 which is an isolation and threshold detector which compares signal A to a threshold level and if signal A is above the threshold level couples signal A to converter 10-2. Converter 10-2 converts the analog signal A of a frequency $F_A$ to the digital signal B. The digital signal B is then coupled to edge detector 20 which produces, as an output, signal C which consists of a single short duration output pulse for every complete input cycle of signal B. Signal C is, in turn, coupled in parallel to counter 30 and sample time controller 40. At binary counter 30-1 the pulses of signal C, beginning at time $t_0$, are counted with the running total count being decoded by binary decoder 30-2 which, in turn couples a decoder True signal to lower band edge detector 30-3 [if] *when* the decoded binary count is equal to the lower bandpass, *i.e., when* $N_A = N_L$, and a decoder False signal to upper band edge detector 30-4 [if] *when* the decoded binary count is [above] *equal to* the upper bandpass, *i.e., when* $N_A = N_H$. At sample time controller 40 the first pulse of signal C triggers time generator synchronizer 40-1 coupling a single short duration pulse to synchronizer edge detector 40-2 that couples the signal D to the sample time generator 60. Signal D triggers time base generator 60-1 to generate signal E which is, in turn, coupled to time base leading edge detector 60-2 which generates as an output therefrom signal F which is coupled to edge triggered bistable multivibrator or flip-flop 80-1 of memory element 80 by way of inverter 80-2 and to time base trailing edge detector 70-1 which generates an output signal G. Signal G resets the binary counter 30-1 to O and through NAND gate 70-3 and inverter 70-4 sets bistable multivibrator or flip-flop 70-2. At this time, edge triggered bistable multivibrator 80-1 of memory element 80 is coupling a relatively low level False state of output signal O to an output line 80-3 and as a first input to NAND gate 50-1 of synchronizer controller 50.

Counter 30 is set to a bandpass of a count of 6 – 20, *i.e.*, $6 \leq N_A < 20$, and, accordingly, at the count of 6 binary decoder 30-2 couples a True decode pulse to lower band edge detector 30-3 which, in turn couples decode True signal H to bistable multivibrator 70-2 causing it to change its state. Binary counter 30–1 continues counting the subsequent pulses 7 – 19 of signal C causing lower band edge detector 30-2 to remain in its previously set True state.

At the end of the sample time $T_S$ time base generator 60-1 couples the second pulse of signal E to time base leading edge detector 60-2 which, in turn, couples the second pulse of signal F to edge triggered bistable multivibrator 80-1 by way of inverter 80-2 which gates the state of bistable multivibrator 80-2 therein causing memory element 80 to couple to its output line the relatively high level True state of output signal O and through NAND gate 70-3 and inverter 70-4 causes bistable multivibrator 70-2 to change to a False state. The concurrent application of the signal G and signal O at NAND gate 50-1 disables the time generator synchronizer 40-1.

Under the above described conditions the input signal A has been assumed to be within the bandpass of a pulse count of 6 – 20, *i.e.*, $6 \leq N_A < 20$, e.g., $F_L = 900$ Hz, $F_H = 3000$ Hz at a sample time $T_S$ of $6.67 \times 10^{-3}$ sec. If the count had been *equal to or* greater than 20, *i.e.*, $N_A \geq 20$, at time $t_1$, e.g., after sample time $T_S$ binary decoder 30-2 would have coupled the appropriate signal to upper band edge detector 30-4 which, in turn, would have coupled a decode False pulse to NAND gate 70-3 and inverter 70-4 which, in turn, would have changed the state of bistable multivibrator 70-2 which False state of bistable multivibrator 70-2 would have caused edge triggered bistable multivibrator 80-1 to couple the low level False state of output signal O to output line 80-3 when gated by inverter 80-2. Alternatively, if the count had been less than 6, *i.e.*, $6 > N_A$, at time $t_1$, e.g., after sample time $T_S$, binary decoder 30-2 would not have coupled any True decode signal to lower band edge detector 30-3 whereby no high level pulse of signal H would have been coupled to bistable multivibrator 70-2 causing edge triggered bistable multivibrator 80-1 to continue coupling the relatively low level False state of output signal O to output line 80-3 of memory 80 when triggered by inverter 80-2. With the output signal A continuing to be of a frequency $F_A$ within the bandpass, memory element [A] *80* continues coupling its relatively high level True state of output signal O to its output line 80-3. However, as at the end of the sample time $T_S$ at time $t_1$ the second pulse of signal F from time base trailing edge detector 70-1 has reset binary counter 30-1 to O the above described sequence repeats itself testing the incoming signal A for its frequency $F_A$ to determine, if at any time, it is within or without the bandpass and to provide a corresponding high level True state or low level False state of output signal O on its output line 80-3.

What is claimed is:

1. A digital detector of an analog signal, comprising:

means receiving an input analog signal of a frequency $F_A$ for generating a digital signal of a frequency $F_A$ therefrom;

counting means coupled to said digital signal for counting the number of pulses $N_A$ thereof during a preset sample time $T_S$ and generating a decode True signal if the counted number of pulses is equal to or greater than a preset low $N_L$ number of pulses and generating a decode False signal if the counted number of pulses is *equal to or* greater than a preset high $N_H$ number of pulses for defining a preset bandwidth [$N_L \leq N_A \leq N_H$] $N_L \leq N_A < N_H$;

an output flip-flop for generating as the alternative output signals an output True signal or an output False signal indicating that said counting means has counted a number of pulses $N_A$ of said digital signal that is within or without, respectively, said preset bandwidth;

a decoder flip-flop responsively coupled to said decode True signal and said decode False signal for storing a decoder True signal or a decoder False signal;

means gating the decoder True signal or the decoder False signal from said decoder flip-flop into said output flip-flop for storing and generating an output False signal or an output True signal, respectively, on a detector output line therefrom.

2. A digital detector of an analog signal, comprising:

means receiving an input analog signal of a frequency $F_A$ for generating a digital signal comprising a series of short duration pulses of a frequency $F_A$, one pulse for every cycle of said input analog signal;

sample time base generator means coupled to said digital signal for generating, when effected by a first pulse of said digital signal, a sample time signal comprising a first sample time pulse and after the sample time $T_S$ a second sample time pulse;

counting means coupled to said digital signal for counting the number of pulses $N_A$ thereof during said sample time $T_S$ and generating a decode True signal if the counted number of pulses is equal to *or greater than* a preset low $N_L$ count and generating a decode False signal if the counted number of pulses is *equal to or* greater than a preset high $N_H$ count for defining a preset bandwidth [$N_L \leq N_A \leq N_H$] $N_L \leq N_A \leq N_H$;

means coupling said sample time signal to said counting means for resetting said counting means to a zero count upon receipt of said first sample time pulse;

output memory means for generating as the alternative output signals an output True signal or an output False signal indicating that said counting means has counted a number of pulses of said digital signal that is within or without, respectively, said preset bandwidth;

decoder memory means coupled to said decode True signal and said decode False signal for coupling a decoder True signal or a decoder False signal to said output memory means;

means coupling said second sample time pulse to said output memory means for gating the decoder True signal or the decoder False signal from said decoder memory means into said output memory means and coupling an output True signal or an output False signal, respectively, therefrom on a detector output line.

3. The digital detector of claim 2 further including:

gating means coupled to said detector output line and said sample time base generator means for generating a new sample time signal when affected by an output False signal.

*4. A bandpass digital filter, comprising:*

*means for receiving an input signal of a frequency $F_A$;*

*means responsively coupled to said receiving means for counting the number of pulses $N_A$ of said input signal during a sample time $T_S$;*

*means responsively coupled to said counting means for generating a first signal if the counted number of pulses $N_A$ is equal to or greater than a low $N_L$ number of pulses and for generating a second signal if the counted number of pulses $N_A$ is equal to or greater than a high $N_H$ number of pulses for defining a bandpass $N_L \leqslant N_A < N_H$;*

*means responsively coupled to said bandpass defining means for generating a within bandpass output signal only when said first signal but not said second signal was coupled thereto.*

*5. A bandpass digital filter, comprising:*

*means for generating a sample time signal of a duration $T_S$;*

*means for receiving an input signal of a frequency $F_A$;*

*means responsively coupled to said sample time signal generating means and said input signal receiving means for counting the number of pulses $N_A$ of said input signal during said sample time $T_S$;*

*means responsively coupled to said counting means for generating a first signal when the counted number of pulses $N_A$ is equal to a low $N_L$ number of pulses and a second signal when the counted number of pulses $N_A$ is equal to a high $N_H$ number of pulses for defining a bandpass $N_L \leqslant N_A < N_H$;*

*means responsively coupled to said bandpass defining means for generating a within bandpass output signal only if said first signal but not said second signal was coupled thereto.*

*6. A bandpass digital filter, comprising:*

*sample timing means for generating successive sample timing pulses, successive ones of which define successive sample times of a fixed duration $T_S$;*

*input means for receiving an input signal of a frequency $F_A$;*

*counting means responsively coupled to said sample timing means and said input means for counting the number of pulses $N_A$ of an input signal during each of the successive ones of said sample times $T_S$;*

*detector means responsively coupled to said counting means for generating a lower band edge detector signal when the counted number of pulses $N_A$ is equal to a preset low $N_L$ number of pulses and an upper band edge detector signal when the counted number of pulses $N_A$ is equal to a preset high $N_H$ number of pulses for defining a preset bandpass $N_L \leqslant N_A < N_H$;*

*output signal means responsively coupled to said detector means for generating a within bandpass signal only when said lower band edge detector signal but not said upper band edge detector signal is coupled thereto during any one of said successive sample times $T_S$.*

*7. The bandpass filter of claim 6 wherein said output signal means includes a memory means;*

*means coupling said sample timing means to said memory means for setting said memory means into an initial False state at the beginning of each one of said successive sample times $T_S$.*

*8. The bandpass filter of claim 7 wherein said output signal means includes means for coupling said lower band edge detector signal to said memory means for setting said memory means into a True state from said initial False state.*

*9. The bandpass filter of claim 8 wherein said output signal means includes means coupling said upper band edge detector signal to said memory means for setting said memory means back into said initial False state from said True state.*

*10. A bandpass digital filter, comprising:*

*means for generating successive sample time signals that define successive sample times that are each of a fixed duration $T_S$;*

*means for receiving an input signal of a frequency $F_A$;*

*means responsively coupled to said successive sample time signal generating means and said input signal receiving means for counting the number of pulses $N_A$ of said input signal during each one of said successive sample times;*

*means responsively coupled to said counting means for generating a first signal when during a first one of said successive sample times the counted number of pulses $N_A$ is equal to a low $N_L$ number of pulses, i.e., $N_L = N_A$, and for generating a second signal when during said first one of said successive sample times the counted number of pulses $N_A$ is equal to a high $N_H$ number of pulses, i.e., $N_A = N_H$, said first and second signals defining a bandpass width $N_L \leqslant N_A < N_H$;*

*means responsively coupled to said bandpass width defining means for generating a within bandpass output signal during a second one of said successive sample times next following said first one of said successive sample times only when said first signal but not said second signal was coupled thereto during said first one of said successive sample times.*

* * * * *

UNITED STATES PATENT AND TRADEMARK OFFICE

CERTIFICATE OF CORRECTION

PATENT NO. : Re. 28,997

DATED : October 5, 1976

INVENTOR(S) : C. D. Cardon, et al

It is certified that error appears in the above-identified patent and that said Letters Patent are hereby corrected as shown below:

Column 4, line 50, "$N_H]\ N_L \leqslant N_A \leqslant N_H$;" should be --$N_H]\ N_L \leqslant N_A < N_H$;--.

Signed and Sealed this

Fourteenth Day of December 1976

[SEAL]

*Attest:*

RUTH C. MASON
*Attesting Officer*

C. MARSHALL DANN
*Commissioner of Patents and Trademarks*